United States Patent
Finger et al.

(10) Patent No.: US 11,168,013 B2
(45) Date of Patent: Nov. 9, 2021

(54) IN-SITU RESOURCE UTILIZATION-DERIVED WATER PURIFICATION AND HYDROGEN AND OXYGEN PRODUCTION

(71) Applicant: Paragon Space Development Corporation, Tucson, AZ (US)

(72) Inventors: Barry Wynns Finger, Santa Fe, TX (US); Laura Katrina Kelsey, Tucson, AZ (US); Chad E. Bower, Littleton, CO (US)

(73) Assignee: Paragon Space Development Corporation, Tucson, AZ (US)

( * ) Notice: Subject to any disclaimer, the term of this patent is extended or adjusted under 35 U.S.C. 154(b) by 0 days.

(21) Appl. No.: 16/410,198

(22) Filed: May 13, 2019

(65) Prior Publication Data
US 2019/0263699 A1 Aug. 29, 2019

Related U.S. Application Data

(63) Continuation-in-part of application No. 16/118,325, filed on Aug. 30, 2018, now abandoned, which is a
(Continued)

(51) Int. Cl.
*B01D 8/00* (2006.01)
*C02F 1/02* (2006.01)
(Continued)

(52) U.S. Cl.
CPC ............... *C02F 9/00* (2013.01); *B01D 5/006* (2013.01); *B01D 8/00* (2013.01); *B01D 19/0031* (2013.01);
(Continued)

(58) Field of Classification Search
CPC ...... C02F 9/00; C02F 1/22; C02F 1/02; C02F 1/447; C02F 1/448; C02F 2301/063;
(Continued)

(56) References Cited

U.S. PATENT DOCUMENTS 3,415,719 A 12/1968 Telkes
3,547,271 A 12/1970 Edwards
(Continued)

FOREIGN PATENT DOCUMENTS

AU 2012233249 A1 10/2013
WO WO00/22684 A2 4/2000
(Continued)

OTHER PUBLICATIONS

Artemis Project: How to Get Oxygen from the Moon, 2007, pp. 1-4. (Year: 2007).*
(Continued)

*Primary Examiner* — Pranav N Patel
(74) *Attorney, Agent, or Firm* — Weaver Austin Villeneuve & Sampson LLP

(57) ABSTRACT

This disclosure provides an integrated system and method for producing purified water, hydrogen, and oxygen from contaminated water. The contaminated water may be derived from regolith-based resources on the moon, Mars, near-Earth asteroids, or other destination in outer space. The integrated system and method utilize a cold trap to receive the contaminated water in a vapor phase and selectively freeze out water from one or more volatiles. A heat source increases temperature in the cold trap to vaporize the frozen contaminated water to produce a gas stream of water vapor and volatiles. A chemical scrubber may remove one or more volatiles. The integrated system and method utilize ionomer membrane technology to separate the water vapor from remaining volatiles. The water vapor is delivered for crew
(Continued)

use or delivered to an electrolyzer to produce hydrogen and oxygen.

15 Claims, 7 Drawing Sheets

Related U.S. Application Data continuation-in-part of application No. 15/704,889, filed on Sep. 14, 2017, now Pat. No. 10,752,523.

(60) Provisional application No. 62/396,011, filed on Sep. 16, 2016.

(51) Int. Cl.

| | | |
|---|---|---|
| *C02F 1/22* | (2006.01) | |
| *C02F 9/00* | (2006.01) | |
| *C25B 1/04* | (2021.01) | |
| *C02F 1/44* | (2006.01) | |
| *B01D 53/22* | (2006.01) | |
| *B01D 5/00* | (2006.01) | |
| *B01D 71/00* | (2006.01) | |
| *B01D 53/58* | (2006.01) | |
| *B01D 19/00* | (2006.01) | |
| *C02F 101/10* | (2006.01) | |
| *C02F 103/06* | (2006.01) | |
| *C02F 101/16* | (2006.01) | |

(52) U.S. Cl.
CPC ........... *B01D 53/229* (2013.01); *B01D 53/58* (2013.01); *B01D 71/00* (2013.01); *C02F 1/02* (2013.01); *C02F 1/22* (2013.01); *C02F 1/447* (2013.01); *C02F 1/448* (2013.01); *C25B 1/04* (2013.01); *B01D 2251/506* (2013.01); *B01D 2257/302* (2013.01); *B01D 2257/304* (2013.01); *B01D 2257/406* (2013.01); *C02F 2101/101* (2013.01); *C02F 2101/16* (2013.01); *C02F 2103/06* (2013.01); *C02F 2201/001* (2013.01); *C02F 2201/008* (2013.01); *C02F 2209/02* (2013.01); *C02F 2209/03* (2013.01); *C02F 2301/063* (2013.01)

(58) Field of Classification Search
CPC .............. C02F 2209/03; C02F 2103/06; C02F 2209/02; C02F 2201/008; C02F 2101/16; C02F 2101/101; C02F 2201/001; B01D 5/006; B01D 71/00; B01D 53/58; B01D 19/0031; B01D 8/00; B01D 53/229; B01D 2251/506; B01D 2257/304; B01D 2257/302; B01D 2257/406; B01D 2311/06; B01D 2311/2684; B01D 2311/04; B01D 2311/2626; B01D 61/364; C25B 1/04; Y02E 60/36

See application file for complete search history.

(56) References Cited

U.S. PATENT DOCUMENTS

| | | | |
|---|---|---|---|
| 3,612,282 | A | 10/1971 | Cheng |
| 4,373,462 | A | 2/1983 | Fish |
| 4,568,441 | A | 2/1986 | Covitch et al. |
| 5,028,298 | A | 7/1991 | Baba et al. |
| 5,232,085 | A | 8/1993 | Hayashi et al. |
| 5,547,551 | A | 8/1996 | Bahar et al. |
| 7,510,752 | B1 | 3/2009 | Robertson |
| 9,399,195 | B2 | 7/2016 | MacCallum et al. |
| 9,511,327 | B2 | 12/2016 | MacCallum et al. |
| 9,695,066 | B2 | 7/2017 | MacCallum et al. |
| 10,752,523 | B2 | 8/2020 | Bower et al. |
| 2004/0211726 | A1 | 10/2004 | Baig et al. |
| 2005/0164025 | A1 | 7/2005 | Simonetti et al. |
| 2006/0081455 | A1 | 4/2006 | Yonover |
| 2008/0182149 | A1 | 7/2008 | Zhang et al. |
| 2008/0296215 | A1 | 12/2008 | Simon |
| 2009/0057128 | A1 | 3/2009 | Vane et al. |
| 2009/0181276 | A1 | 7/2009 | Beutel et al. |
| 2009/0266048 | A1 | 10/2009 | Schwarz |
| 2010/0028635 | A1 | 2/2010 | Bansal et al. |
| 2010/0096317 | A1 | 4/2010 | Morita |
| 2012/0137727 | A1 | 6/2012 | Huang et al. |
| 2012/0152840 | A1 | 6/2012 | Fujita et al. |
| 2012/0255897 | A1 | 10/2012 | Lu et al. |
| 2012/0292176 | A1 | 11/2012 | Machhammmer et al. |
| 2013/0075333 | A1 | 3/2013 | Pruet et al. |
| 2013/0081537 | A1 | 4/2013 | Bikson et al. |
| 2014/0263061 | A1 | 9/2014 | Taylor et al. |
| 2015/0217232 | A1 | 8/2015 | MacCallum et al. |
| 2016/0304364 | A1 | 10/2016 | MacCallum et al. |
| 2017/0113950 | A1 | 4/2017 | Bahar et al. |
| 2018/0079662 | A1 | 3/2018 | Bower et al. |
| 2018/0370816 | A1 | 12/2018 | Bower et al. |
| 2019/0263699 | A1 | 8/2019 | Finger et al. |
| 2020/0198991 | A1 | 6/2020 | Bower et al. |
| 2021/0017045 | A1 | 1/2021 | Finger et al. |

FOREIGN PATENT DOCUMENTS

| | | |
|---|---|---|
| WO | WO2009/005897 | 1/2009 |
| WO | WO2015/116959 | 8/2015 |
| WO | WO2018/053151 | 3/2018 |

OTHER PUBLICATIONS

Uday Hegde, R. Balasubramaniam, S. Gokoglu; Analysis of Water Extraction from Lunar Regolith, Conference: 50th AIAA Aerospace Sciences Meeting including the New Horizons Forum and Aerospace Exposition, Jan. 2012, pp. 1-11. (Year: 2012).*
Office Action issued in U.S. Appl. No. 14/609,735, dated Jul. 8, 2015.
Notice of Allowance issued in U.S. Appl. No. 14/609,735, dated Dec. 7, 2015.
Notice of Allowance issued in U.S. Appl. No. 14/609,735, dated Apr. 1, 2016.
Notice of Allowance issued in U.S. Appl. No. 15/194,391, dated Aug. 3, 2016.
Office Action issued in U.S. Appl. No. 15/343,150, dated Dec. 29, 2016.
Notice of Allowance issued in U.S. Appl. No. 15/343,150, dated Apr. 14, 2017.
International Search Report and Written Opinion issued in Application No. PCT/US15/13829, dated May 8, 2015.
International Preliminary Report on Patentability issued in Application No. PCT/US15/13829, dated Mar. 5, 2016.
International Search Report and Written Opinion issued in Application No. PCT/US17/51598, dated Dec. 7, 2017.
Kelsey, et al., "Development of Ionomer-membrane Water Processor (IWP) Technology for Water Recovery from Urine," 44th International Conference on Environmental Systems, Tucson, AZ, Jul. 13-17, 2014, pp. 1-23.
Kelsey, et al., "Inspiration Mars ETDU Water Management System Test Results," 44th International Conference on Environmental Systems, Tucson, AZ, Jul. 13-17, 2014, pp. 1-28.
Kelsey, et al., Contaminant Robust Water Extraction from Lunar and Martian Soil for In Situ Resource Utilization—System Testing, American Institute of Aeronautics and Astronautics, pp. 1-15.
Kelsey, et al., Purifying Water Mined from Asteroids for In Situ Resource Utilization, Paragon: Space Development Corporation, pp. 1-23.
Kelsey, et al., "Employing Ionomer-Based Membrane pair technology to extract water from brine," 42nd International Conference on Environmental Systems, Tucson, AZ, Jul. 15-19, 2012, pp. 1-20.
Kelsey, et al., "Contaminant Robust Water Extraction from Lunar and Martian Soil for In Situ Resource Utilization—System Archi-

(56) References Cited

OTHER PUBLICATIONS tecture Development," 42nd International Conference on Environmental Systems, Tucson, AZ, Jul. 15-19, 2012, pp. 1-14.
US Miscellaneous Communication issued in U.S. Appl. No. 15/194,391, dated Aug. 22, 2016.
Office Action issued in U.S. Appl. No. 15/704,889, dated Jun. 19, 2019.
Office Action issued in U.S. Appl. No. 15/704,889, dated Jan. 17, 2020.
Notice of Allowance issued in U.S. Appl. No. 15/704,889, dated Apr. 27, 2020.
Office Action issued in U.S. Appl. No. 16/118,325, dated Jun. 20, 2019.
Final Office Action issued in U.S. Appl. No. 16/118,325, dated Dec. 3, 2019.
Office Action issued in U.S. Appl. No. 16/808,147, dated Oct. 9, 2019.
International Preliminary Report on Patentability issued in Application No. PCT/US2017/051598, dated Mar. 28, 2019.
Chudnovsky, Y. et al., "Integrated Industrial Wastewater Reuse by Heat Recovery," Energy Research and Development Division, Final Project Report, Mar. 2015, 59 pages.
Singh, D. "Desalination of brine and produced water by direct contact membrane distillation at high temperatures and pressure," Journal of Membrane Science, vol. 389, 2012, pp. 380-388.
He, F. et al. "High water recovery in direct contact membrane distillation using a series of cascades," Desalination, vol. 323, 2013, pp. 48-54.
Karanikola, V., et al., "Sweeping gas membrane distillation: Numerical simulation of mass and heat transfer in a hollow fiber membrane module," Journal of Membrane Science, vol. 483, 2015, pp. 35-24.
Wirth, D., et al., "Water desalination using membrane distillation: comparison between inside/out and outside/in permeation," Desalination, vol. 147, 2002, pp. 139-145.
Singh, D., et al., "High temperature direct contact membrane distillation based desalination using PTFE hollow fibers," Chemical Engineering Science, vol. 116, 2014, pp. 824-833.
U.S. Appl. No. 16/948,819, filed Oct. 1, 2020, Finger et al.
Final Office Action issued in U.S. Appl. No. 16/808,147, dated Apr. 7, 2021.
Linne, D. et al., "Current Activities in the Advanced Exploration Systems ISRU Project," NASA, Presented at the Joint Space Resources Roundtable/Planetary & Terrestrial Mining and Sciences Symposium, Jun. 12-15, 2018, 30 pages.
Anthony, S.M., et al., "Contaminant Removal from Oxygen Production Systems for In Situ Resources Utilization," American Institute of Aeronautics and Astronautics, Sep. 11, 2012, 23 pages.
Lewis, J.S., "In Space Production of Storable Propellants," NIAC Phase I Final Report for NNX15AL85G, Deep Space Industries, Mar. 1, 2016, 68 pages.
International Search Report and Written Opinion issued in Application No. PCT/US2020/031614, dated Aug. 18, 2020.

* cited by examiner

IN-SITU RESOURCE UTILIZATION-DERIVED WATER PURIFICATION AND HYDROGEN AND OXYGEN PRODUCTION

STATEMENT REGARDING FEDERALLY SPONSORED RESEARCH OR DEVELOPMENT

Some embodiments of this invention were made with United States Government Support under Contract Nos. 80NSSC18C0191, NNX16CJ18P, and 80HQTR19C0018 awarded by the National Aeronautics and Space Administration (NASA). The U.S. Government has certain rights in this invention.

INCORPORATION BY REFERENCE

An Application Data Sheet is filed concurrently with this specification as part of the present application. Each application that the present application claims benefit of or priority to as identified in the concurrently filed Application Data Sheet is incorporated by reference herein in its entirety and for all purposes.

TECHNICAL FIELD

This disclosure relates to systems, apparatuses, and methods of generation of purified water, oxygen, and hydrogen from a contaminated water source, and more particularly to producing purified water from regolith-based resources using a selective membrane distillation process and producing oxygen and hydrogen using an electrolyzer.

BACKGROUND

While water is ubiquitous on earth, water is very rare and extremely valuable in space. Water is a key ingredient to life and is a key ingredient for long-term missions in space. Extended missions to the moon, Mars, near-Earth asteroids, and other destinations in space will require propellant such as hydrogen as well as life support consumables such as water and oxygen. However, there is a high cost to delivering supplies to space, and the burden of transporting propellant and life support consumables is substantial and limits further long-term space exploration and settlement. Thus, in-situ resource utilization (ISRU) to generate propellant and life support consumables is imperative to sustaining long-term missions in space. ISRU-derived propellant and life support consumables can achieve a sustained presence on the moon, and eventually human missions to Mars and beyond are possible.

Missions to the moon have revealed evidence that certain regions on the moon, including those permanently in shadow or near-permanently in shadow, contain substantial concentrations of water ice. Furthermore, missions by various probes have detected the presence of water ice on Mars and near-Earth asteroids. However, extracting pure water from such water ice is a challenge. For example, many water purification technologies may require moving parts or may not operate in a reduced or micro-gravity environment. In addition or in the alternative, water purification technologies may not withstand the harsh conditions in space or may require regeneration or resupply of components over time. In addition or in the alternative, water on the moon, Mars, or near-Earth asteroids contains various contaminants that water purification technologies may not be able to effectively remove, or at least such contaminants may degrade components of the water purification technologies over time. Once pure water is derived from regolith-based resources, the water may be used as a life support consumable or may be used to generate oxygen, which may then be used as a life support consumable or fuel in space applications. Moreover, the water may be used to generate hydrogen, which may be used as fuel in space applications.

SUMMARY

The systems, methods and devices of this disclosure each have several innovative aspects, no single one of which is solely responsible for the desirable attributes disclosed herein.

One innovative aspect of the subject matter described in this disclosure can be implemented in a system for producing water, hydrogen, and oxygen from contaminated water. The system includes a cold trap configured to receive contaminated water in a vapor phase, a heat source thermally coupled to the cold trap, a chemical scrubber downstream from the cold trap, a membrane-based water separator downstream from the chemical scrubber and fluidly coupled to the chemical scrubber, and an electrolyzer downstream from the membrane-based water separator. The membrane-based water separator includes an ionomer membrane configured to be permeable to water vapor and impermeable to one or more contaminants. The electrolyzer is configured to produce hydrogen and oxygen from the water vapor.

In some implementations, the system further includes a compressor downstream from the cold trap and fluidly coupled to the cold trap, where the chemical scrubber is downstream from or upstream from the compressor. In some implementations, the compressor is configured to reduce a water vapor partial pressure in the cold trap and to increase a water vapor partial pressure differential across the ionomer membrane. In some implementations, the temperature and pressure of the cold trap selectively deposits the contaminated water from the vapor phase to produce partially contaminated water in a solid phase. In some implementations, the heat source is configured to vaporize the partially contaminated water in the solid phase to produce a gas stream comprising the water vapor and volatiles. In some implementations, the system further includes a water polisher upstream from the electrolyzer and downstream from the membrane-based water separator and fluidly coupled to the membrane-based water separator. In some implementations, the water polisher is located downstream from the cold trap and upstream from the membrane-based water separator. In some implementations, the system further includes a condenser downstream from and fluidly coupled with the membrane-based water separator, where the condenser is configured to collect the water vapor. In some implementations, the condenser includes an associated cold trap, the cold trap associated with the condenser being different than the cold trap configured to receive the contaminated water in the vapor phase. In some implementations, the system further includes one or more gas dryers downstream from and fluidly coupled to the electrolyzer for producing dry hydrogen and dry oxygen from the hydrogen and the oxygen. In some implementations, the ionomer membrane includes a non-porous fluorinated ionomer membrane with exposed sulfonic acid groups.

Another innovative aspect of the subject matter described in this disclosure can be implemented in a method of producing water, hydrogen, and oxygen from contaminated water. The method includes receiving contaminated water into a cold trap in a vapor phase, selectively depositing the contaminated water to provide partially contaminated water in a solid phase, generating a partially contaminated gas stream comprising water vapor and volatiles of the partially contaminated water using a heat source thermally coupled to the cold trap, removing one or more volatiles from the partially contaminated gas stream by a chemical scrubber, selectively separating the water vapor from residual volatiles at a membrane-based water separator, electrolyzing the water vapor to produce hydrogen and oxygen using an electrolyzer downstream from the membrane-based water separator. The membrane-based water separator is downstream from the chemical scrubber.

In some implementations, selectively depositing the contaminated water includes controlling a temperature and pressure of the cold trap to deposit water and keep one or more volatiles of the contaminated water in the vapor phase. In some implementations, a partial pressure of water in the cold trap is equal to or less than about 611 Pa and a temperature of the cold trap is less than about 273 K. In some implementations, the method further includes sealing the cold trap after selectively depositing the contaminated water, and heating the sealed cold trap to a temperature equal to or greater than about 373 K before generating the partially contaminated gas stream. In some implementations, the membrane-based water separator includes an ionomer membrane, the ionomer membrane having a first surface configured to receive and contact the partially contaminated gas stream and a second surface opposite the first surface, and a water vapor partial pressure at the second surface is less than a water vapor partial pressure at the first surface. In some implementations, the ionomer membrane includes a nonporous fluorinated ionomer membrane with exposed sulfonic acid groups. In some implementations, the method further includes reducing partial pressure of water in a space above the partially contaminated water in the solid phase using a compressor to drive mass transfer of the partially contaminated gas stream.

BRIEF DESCRIPTION OF THE DRAWINGS

Like reference numbers and designations in the various drawings indicate like elements.

DETAILED DESCRIPTION

Introduction

Figure 1:
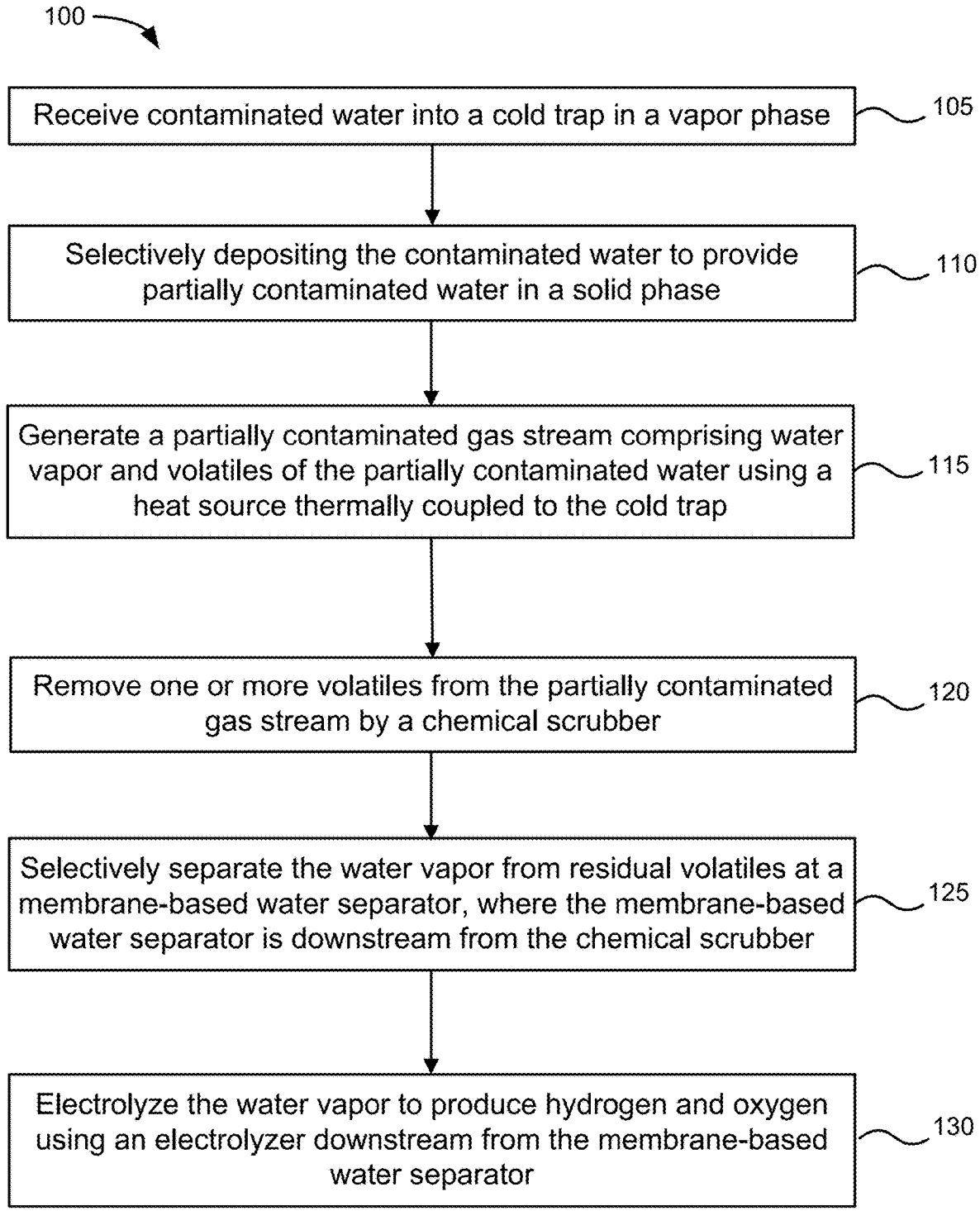
FIG. 1 shows a flow diagram of an example method of producing water, hydrogen, and oxygen from contaminated water according to some implementations.

Recovery of water from contaminated water for reuse or for production of hydrogen and oxygen may offer significant advantages in space applications. Conventional purification processes may not be sufficient and practical for treating contaminated water in outer space. Conventional purification processes may not be suitable in low-gravity or microgravity environments, in the harsh conditions of outer space, or in treating the contaminants that accompany water or water ice found in outer space. Conventional water purification systems may be insufficient, may degrade over time, or may be too costly to operate. In addition, each operation for collection of contaminated water from regolith-based resources, for purification of the contaminated water, and for production of hydrogen and oxygen from purified water generally occur in separate, distinct processes and/or facilities. Not only are there challenges to recovering purified water, hydrogen, and oxygen from a contaminated water source in outer space, but there are challenges to integrating and interfacing the foregoing processes.

Integrated System for Producing Water, Hydrogen, and Oxygen

The present disclosure provides a water purification system for recovering water from regolith-based resources, such as recovering water from water ice on the moon, near-Earth asteroids, or Mars. The present disclosure also provides an integrated system for producing hydrogen and oxygen, in addition to purified water, from contaminated water collected from regolith-based resources. Thus, the present disclosure provides an ISRU-derived water purification system that can be integrated with a system for hydrogen and oxygen production. The integrated system can include a cold trap, a membrane-based water separator, and an electrolyzer. The contaminated water may be received by the membrane-based water separator without forced convection. In some implementations, the integrated system can optionally include a compressor upstream from and fluidly coupled to the membrane-based water separator, and downstream from and fluidly coupled to the cold trap. In some implementations, the membrane-based water separator may include an ionomer membrane. The membrane-based water separator does not require moving parts and may operate in low-gravity or micro-gravity environments and under the harsh conditions of outer space. In some implementations, a chemical scrubber such as an ammonia scrubber may be between the cold trap and the membrane-based water separator. In some implementations, the temperature and pressure in the cold trap may selectively deposit/freeze water so that one or more volatiles of the contaminated water remain in a vapor phase (i.e., unfrozen). The membrane-based water separator may produce purified water, which may or may not be further purified by a water polisher. At least some of the purified water may be received by the electrolyzer to produce hydrogen and oxygen, where one or more gas dryers may be provided to remove water so that low-temperature purified hydrogen and oxygen may be stored as propellant, and at least some of the purified water is received in a condenser, secondary cold trap, or collector for use by crew members.

FIG. 1 shows a flow diagram of an example method of producing water, hydrogen, and oxygen from contaminated water according to some implementations. The operations in a process 100 of FIG. 1 may be performed in different orders and/or with different, fewer, or additional operations. In some implementations, the operations in the process 100 may be performed by one or more systems shown in FIGS. 2, 3, and 7.

At block 105 of the process 100, contaminated water may be received into a cold trap. The contaminated water may be received in a vapor phase. In some implementations, the contaminated water may be frozen in regolith-based resources, such as in the form of water ice on the moon, on near-Earth asteroids, or on Mars. The contaminated water may include various contaminants, such as water-soluble acids, ions, and compounds. For example, the contaminated water may include hydrogen sulfide ($H_2S$), ammonia ($NH_3$), and sulfur dioxide ($SO_2$), ethylene ($C_2H_4$), among other contaminants. Table 1 lists several compounds found in lunar water. Other possible contaminants may include, for example, chlorine ($Cl_2$) and hydrochloric acid (HCl), which may be found on Martian soil.

TABLE 1

| Compound | Concentration (% relative to $H_2O$) |
|---|---|
| $H_2O$ | 100% |
| $H_2S$ | 16.75% |
| $NH_3$ | 6.03% |
| $SO_2$ | 3.19% |
| $C_2H_4$ | 3.12% |
| $CO_2$ | 2.17% |
| $CH_3OH$ | 1.55% |
| $CH_4$ | 0.65% |
| OH | 0.03% |
| Hg | Not available |
| CO | Not available |

Figure 4:
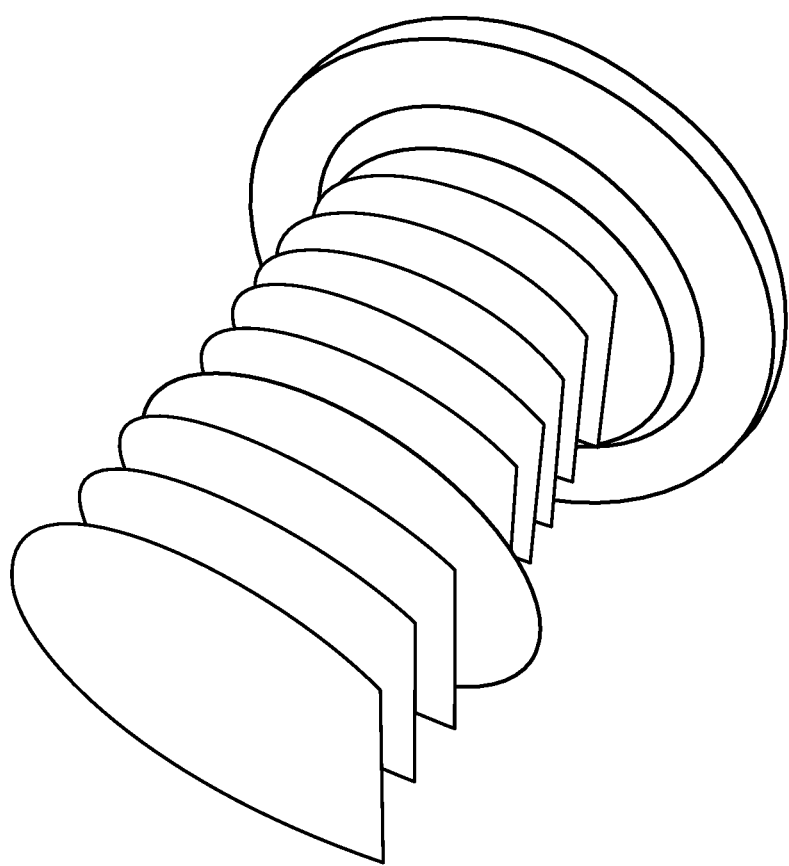
FIG. 4 shows an image of an example cold trap assembly according to some implementations.

Water ice in regolith-based resources, including Martian water and lunar water, may be sublimated or evaporated into the vapor phase and captured in the cold trap. For example, thermal mining operations may heat the surface of Martian or lunar soil so that Martian or lunar water is vaporized. Thus, water and volatiles of contaminated water may be captured in the cold trap. A cold trap serves as a vessel or container for receiving gases and condensing/depositing the gases into liquid or solid form. That way, the gases do not interfere in subsequent operations. The cold trap may include a housing with a gas inlet and a gas outlet. The cold trap may further include a plurality of cooled plates, fins, baffles, or other surfaces in the housing for condensing and collecting the water vapor and/or volatiles into a liquid or solid phase. In some implementations, the cold trap may be transportable or movable so that contaminated water in the vapor phase may be captured in different regions of Mars, the moon, or other destination in outer space. An example of a cold trap is shown in FIG. 4.

At block 110 of the process 100, the contaminated water in the vapor phase is selectively deposited in the cold trap to provide partially contaminated water in a solid phase. Contaminated water in a vapor phase includes water vapor and volatiles that are received through the gas inlet of the cold trap. The temperature and pressure of the cold trap are controlled to cause the water vapor to selectively deposit, and cause at least one or more volatiles to remain in a vapor phase, thereby separating the one or more volatiles. A phase change from a vapor phase to solid phase may be referred to as "deposition," and a phase change from vapor phase to solid phase may be referred to as "freezing." However, as used herein, selectively condensing the contaminated water in the vapor phase to a solid phase may be generally referred to as selective "deposition" or selective "freezing." In some implementations, the one or more volatiles in the vapor phase may be vented out through the gas outlet. What remains in the cold trap may be partially contaminated water in a solid (e.g., frozen) phase.

The cold trap in the present disclosure does not operate at significantly high pressures. In fact, the cold trap in the present disclosure operates at very low pressures during selective freezing. To avoid collection of liquid water, if the temperature were at the triple point temperature of 273 K, the partial pressure of water in the cold trap is equal to or less than about 611 Pa (4.58 Torr). Deposition temperature reduces with pressure. For example, if the temperature were at about 220 K, then the partial pressure of water in the cold trap is equal to or less than about 2.6 Pa (0.02 Torr) to avoid collection of liquid water. Ambient environment temperature may be extremely cold. The ambient environment temperature may be as low as 40 K (−233° C.) and outer space is as low as 2.7 K (−270° C.). In some implementations, the cold trap may be actively or passively cooled to achieve selective freezing distillations. In other words, the cold trap is cold enough at low pressures to capture a large flow fraction of water in a solid phase, but warm enough to prevent condensation of undesirable volatiles.

In some implementations, the temperature of the cold trap during operation 110 is generally below the triple point of water (i.e., 273 K) to perform selective deposition of water vapor. In some implementations, the temperature of the cold trap may be between about 40 K and about 273 K, between about 100 K and about 250 K, or between about 170 K and about 220 K. Accordingly, the partial pressure of water in the cold trap is generally less than about 611 Pa. Lower partial pressures will require lower temperatures for selective deposition of water.

Lower temperatures can improve the efficiency of water flow fraction capture. For example, at least about 50% water can be captured at 265 K, at least about 75% of water can be captured at 257 K, at least about 90% of water can be captured at 248 K, at least about 98% of water can be captured at 233 K, and so on. However, limitations are bounded by deposition of undesirable volatiles. A tradeoff exists between capturing a larger flow fraction of water and deposition of undesirable volatiles. In some implementations, the temperature of the cold trap may be controlled to capture at least 50% water at a temperature below 273 K, but avoid deposition of volatiles such as hydrogen sulfide and ammonia.

Water is selectively deposited in the cold trap and separated from volatiles such as hydrogen sulfide and ammonia. The collected partially contaminated water has fewer contaminants after deposition than initially received in the vapor phase through the aforementioned freeze distillation process.

At block 115 of the process 100, a partially contaminated gas stream of water vapor and volatiles of the partially contaminated water is generated using a heat source fluidly coupled to the cold trap. The partially contaminated water in the solid phase is converted to a vapor phase. Temperature and pressure in the cold trap are controlled to cause the phase change. To liberate the water in the solid phase, heat is applied. If a cold trap operates at partial pressures below the equilibrium partial pressure of the solids, vaporization will occur. Accordingly, if the temperature of the partially contaminated water is below a freezing temperature during vaporization, it will sublimate directly from a solid phase to a vapor phase. If the temperature of the partially contaminated water is above a freezing temperature, it will evaporate from a liquid phase to a vapor phase.

In some implementations, a compressor (e.g., mechanical compressor) fluidly coupled to the cold trap is used to promote vaporization of the frozen partially contaminated water by reducing partial pressure in the cold trap. More specifically, the compressor reduces the partial pressure from a volume above a surface of the partially contaminated water in the solid phase. The compressor serves to pump vapor away from the volume above the surface, thereby reducing the partial pressure. This establishes a partial pressure differential required for sublimation to occur. Sublimation requires heat energy to phase change the partially contaminated water. For mass flow to occur, a pressure differential needs to be created between the equilibrium partial pressure of the partially contaminated water in the solid phase and the partial pressure above its surface, which is created by the compressor. The partial pressure differential drives mass transfer in a steady state process.

The heat source may be thermally coupled to the cold trap. The heat source may be configured to heat the frozen partially contaminated water in the cold trap to produce the partially contaminated gas stream including the water vapor and volatiles. The volatiles constitute the remaining volatiles that were not separated out during selective freeze distillation.

Sublimation can occur at temperatures below about 273 K. In some implementations, the partially contaminated water in the cold trap is heated by the heat source to a temperature between about 215 K and about 265 K or between about 230 K and about 250 K. In a steady state operation during sublimation, the compressor maintains the pressure in the cold trap, where the partial pressure of water is equal to or less than about 611 Pa. The heat source and the compressor may work in tandem to cause sublimation of the partially contaminated water to a vapor phase and to drive mass transfer of the partially contaminated gas stream from the cold trap.

In some implementations, vaporization of the frozen partially contaminated water occurs without the assistance of a compressor. In some implementations, the cold trap may be isolated and sealed off from other components such as a chemical scrubber or membrane-based water separator. The heat source is thermally coupled to the cold trap and applies heat to the frozen partially contaminated water while the cold trap is sealed off, thereby pressurizing the cold trap. The partial pressure of water increases with the heat and with the cold trap being sealed off. The partial pressure of water may be equal to or greater than about 101 kPa (1 atm) in the sealed cold trap. If the selective freeze distillation at block 110 primarily isolated water from undesirable volatiles, then the partial pressure of water approximately equals (or is slightly less than) the total pressure in the cold trap. The cold trap may be heated to a temperature of at least about 373 K so that the frozen partially contaminated water may convert to water vapor and volatiles. And if the selective freeze distillation at block 110 primarily isolated water from undesirable volatiles, then there are not significant contaminants that volatilize at the higher temperature of at least about 373 K. In some implementations, the frozen partially contaminated water may melt to a liquid phase and evaporate to a gas phase to produce a partially contaminated gas stream comprising water vapor and volatiles. Thus, the sealed cold trap may be heated and pressurized to approximately 101 kPa to generate the partially contaminated gas stream, which may comprise mostly water vapor. The total pressure may be made up of predominantly water vapor partial pressure, where the approximately 101 kPa of total pressure may contribute to mass transport by water vapor partial pressure differential. The cold trap may be unsealed so that the partially contaminated gas stream is released and driven out of the cold trap by pressure differentials.

In some implementations, the partially contaminated gas stream comprising water vapor and volatiles may be delivered out of the cold trap with the assistance of a compressor. In some implementations, the partially contaminated gas stream comprising water vapor and volatiles may be delivered out of the cold trap without the assistance of a compressor. This can occur by heating the cold trap to higher temperatures and pressurizing the cold trap to atmospheric or near-atmospheric pressure. However, it will be understood that cold trap may be heated and pressurized with the assistance of a compressor in some implementations. The volatiles in the partially contaminated gas stream may include, for example, ammonia, hydrogen sulfide, sulfur dioxide, and ethylene. Other volatiles in the partially contaminated gas stream may include, for example, chlorine and hydrochloric acid.

In some implementations, the heat source is an external heat source that is electrically-powered. In some implementations, heat source includes a regenerative heat exchanger. The heat exchanger may be thermally coupled to the cold trap and to a condenser. That way, heat may be recuperated from downstream exothermic processes. In some implementations, the heat source is a combination of both an external heat source and a regenerative heat exchanger. In a thermally coupled process described below, the heat source may include a regenerative heat exchanger.

The partially contaminated gas stream is delivered out of the cold trap and to a water purification assembly. The water purification assembly includes the compressor, the heat source, a chemical scrubber, and a membrane-based water separator. In some implementations, the water purification assembly further includes a condenser, a water polisher, and a transfer pump. However, it will be understood that in addition or in the alternative to a condenser, the water purification assembly may include an additional cold trap.

Rather than using forced convection to transport the partially contaminated gas stream through the water purification assembly, the water purification assembly may transport the partially contaminated gas stream by pressure differentials. This may occur in an otherwise isobaric process. This can eliminate introduction of a separate purge/sweep gas and blowers for driving the partially contaminated gas stream through the water purification assembly.

At block 120 of the process 100, one or more volatiles from the partially contaminated gas stream is removed by a chemical scrubber. In some implementations, the chemical scrubber is an ammonia scrubber. Lunar or Martian regolith may contain contaminants such as ions, acids, and water-soluble compounds. Such contaminants may degrade or otherwise reduce the lifetime of a membrane-based water separator. The chemical scrubber may trap and separate out the one or more volatiles from the water vapor in the partially contaminated gas stream. This further purifies the partially contaminated gas stream prior to reaching the membrane-based water separator. Any remaining volatiles in the partially contaminated gas stream after scrubbing by the chemical scrubber may be referred to as residual volatiles. The chemical scrubber may remove the one or more volatiles from the partially contaminated gas stream by chemical reaction. By way of an example, an ammonia scrubber may neutralize ammonia by chemical reaction with dilute sulfuric acid to form a salt, which can be subsequently removed. By way of another example, a chemical scrubber may neutralize contaminants such as hydrogen sulfide, sulfur dioxide, and ethylene.

The chemical scrubber is downstream from and fluidly coupled to the cold trap, and the chemical scrubber is upstream from and fluidly coupled to the membrane-based water separator. An optional compressor is downstream from and fluidly coupled to the cold trap, and the compressor is upstream from and fluidly coupled to the membrane-based water separator. In some implementations, the chemical scrubber is between the compressor and the membrane-based water separator. In some implementations, the chemical scrubber is between the cold trap and the compressor.

At block 125 of the process 100, the water vapor is selectively separated from residual volatiles at a membrane-based water separator, where the membrane-based water separator is downstream from the chemical scrubber. Purified water is collected at the membrane-based water separator or in a condenser downstream from the membrane-based water separator. In some implementations, the condenser is an additional cold trap different than the cold trap for receiving the contaminated water. The purified water may be sufficiently pure for electrolysis by an electrolyzer. In some implementations, a water polisher may further purify the purified water prior to electrolysis.

The membrane-based water separator can include a highly water selective barrier such as an ionomer membrane. In some implementations, the ionomer membrane includes a non-porous fluorinated ionomer membrane with exposed sulfonic acid groups. In some implementations, the membrane-based water separator can include an ionomer membrane so that the water vapor is selectively permeated through the ionomer membrane of the water separation module. Water vapor is selectively permeated through the ionomer membrane while the ionomer membrane is impermeable to various contaminant gases and volatiles. For example, the ionomer membrane is impermeable to acids and compounds such as hydrogen sulfide and sulfur dioxide.

The membrane-based water separator and the cold trap may occupy a separate space in an integrated system or apparatus, and may be connected to each other in a manner to permit mass transport of water in the gas or vapor phase. In some implementations, the membrane-based water separator is spatially separated from and fluidly coupled to the cold trap via the compressor. The compressor may drive mass transport of water vapor across the ionomer membrane of the membrane-based water separator by water vapor partial pressure differentials. In some implementations, the membrane-based water separator is spatially separated from and fluidly coupled to the cold trap without a compressor. The cold trap may be sealed, heated, and pressurized to atmospheric or near-atmospheric pressure. The cold trap may be subsequently unsealed to drive mass transport of water vapor across the ionomer membrane of the membrane-based water separator by water vapor partial pressure differentials.

In some implementations utilizing an ionomer membrane, the ionomer membrane may be configured to substantially exclude the volatiles from passing through the ionomer membrane, where the ionomer membrane may reject a substantial percentage or substantial amount of certain volatiles from passing through. As used herein, "substantial" in the context of rejecting such volatiles may refer to rejection of at least 85% of the volatiles in the membrane-based water separator, at least 90% of the volatiles in the membrane-based water separator, at least 95% of the volatiles in the membrane-based water separator, or at least 98% of the volatiles in the membrane-based water separator. By way of an example, a weight percentage of one or more contaminants in the condensed water may be calculated with the ionomer membrane and without the ionomer membrane. It will be understood that diffusion and secondary transport mechanisms may cause trace amounts of contaminants/volatiles to travel across the ionomer membrane.

As used herein, "substantial" in the context of water vapor permeation may refer to permeation of at least 75% of the water vapor in the membrane-based water separator, at least 80% of the water vapor in the membrane-based water separator, at least 85% of the water vapor in the membrane-based water separator, at least 90% of the water vapor in the membrane-based water separator, at least 95% of the water vapor in the membrane-based water separator, or at least 98% of the water vapor in the membrane-based water separator.

The selective permeation of the water vapor can be driven by a water vapor partial pressure differential across the ionomer membrane. In one example, a compressor between the membrane-based water separator and the cold trap may be configured to increase the water vapor partial pressure differential across the ionomer membrane. In another example, heat and pressurization in the cold trap may be configured to increase the water vapor partial pressure differential across the ionomer membrane. In some implementations, the ionomer membrane includes Nafion®. Additional aspects of the ionomer membrane are discussed below.

The water vapor can pass through the ionomer membrane by being driven by a partial pressure differential. The ionomer membrane may have a first surface facing a "dirty" side of the membrane-based water separator and a second surface facing a "clean" side of the membrane-based water separator that is opposite the first surface. As used herein, the "dirty" side may refer to a side of the membrane-based water separator circulating the partially contaminated gas stream (i.e., dirty gas stream that originates from the cold trap and/or the chemical scrubber) comprising water vapor and residual volatiles or contaminants in the gas phase, and the "clean" side may refer to a side of the membrane-based water separator circulating a purified gas stream (i.e., clean gas stream that is not in direct fluid contact with the contents of the cold trap) comprising water vapor and substantially fewer contaminants in the gas phase than the partially contaminated gas stream.

The partially contaminated gas stream generated from the cold trap and processed through the chemical scrubber may flow to and contact the first surface. Water vapor from the partially contaminated gas stream may permeate across the ionomer membrane to the second surface. For the water vapor to pass from the first surface to the second surface, the water vapor partial pressure at the second surface is less than the water vapor partial pressure at the first surface. In some implementations, the lower partial pressure at the second surface can be generated by having a dry sweep gas or purge gas flowing over the second surface on the "clean" side. In some implementations, the lower partial pressure at the second surface on the "clean" side can be created using the compressor fluidly coupled to the membrane-based water separator. For example, the conversion of the partially contaminated water (e.g., evaporation or sublimation) at block 115 can create a higher partial pressure at the first surface on the "dirty" side, where a component like the compressor can create a significant partial pressure differential between the "dirty" side and the "clean" side. In addition, the compressor can increase a total/partial pressure from the cold trap to create a motive force that expels any remaining unprocessed volatiles at the "dirty" side. The residual volatiles include the remaining unprocessed volatiles.

Figure 5:
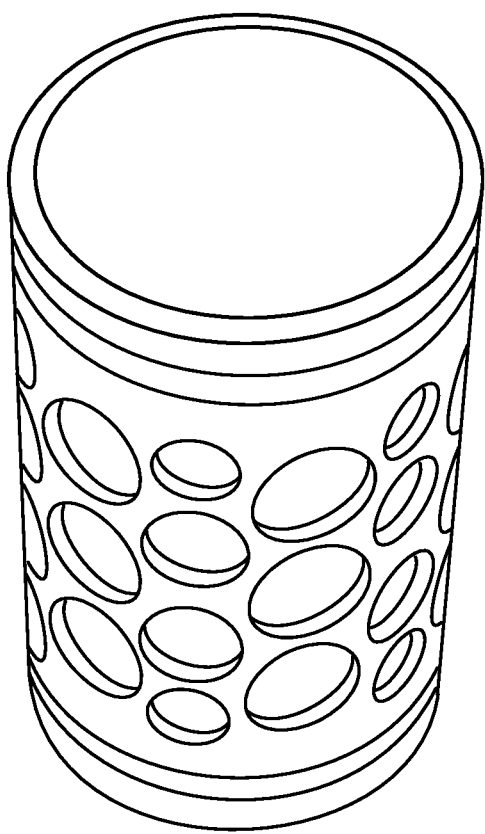
FIG. 5 shows an image of an example membrane-based water separator according to some implementations.

In some implementations of the process 100, the residual volatiles of the partially contaminated gas stream can be rejected or substantially rejected by the ionomer membrane. The ionomer membrane separates the water vapor from the residual volatiles. The residual volatiles may concentrate as a gas mixture. In some implementations, the concentration of residual volatiles may be recollected to be burned. In some implementations, the concentration of residual volatiles may be vented from the system or at least vented from the water purification assembly. The ionomer membrane of the membrane-based water separator may be maintained in spite of sustained contaminant exposure. In particular, the ionomer membrane of the membrane-based water separator does not lead to increased contaminant crossover. An example of a membrane-based water separator is shown in FIG. 5.

In some implementations of the process 100, the water vapor permeated across the membrane-based water separator may be collected as purified water. In some implementations, the purified water may be collected as a clean gas stream for subsequent polishing or electrolysis, where the purified water may be collected at the membrane-based water separator. In some implementations, the purified water may be collected and condensed in a condenser downstream from the membrane-based water separator. The condensed purified water may be introduced for subsequent polishing or electrolysis.

The condenser may be spatially separated from and fluidly coupled to the membrane-based water separator, where the condenser is downstream from the membrane-based water separator. Water vapor may condense in the condenser under appropriate conditions of temperature and pressure. In some implementations where the cold trap and the condenser are thermally coupled, the condenser may have a higher partial pressure and a higher temperature than the cold trap to facilitate condensation in the condenser. In some implementations where the cold trap and the condenser are thermally decoupled, the condenser may have a lower temperature to facilitate condensation in the condenser.

In some implementations, the condenser includes an associated cold trap, where the cold trap associated with the condenser is different than the cold trap associated with selective freeze distillation. The cold trap associated with the condenser may receive the water vapor from the membrane-based water separator at a low temperature to cause condensation of the water vapor. For example, the temperature of the cold trap associated with the condenser may be actively or passively cooled to a temperature less than about 373 K, or equal to or less than about 273 K. That way, water vapor heated to about 373 K and 101 kPa) from the cold trap associated with selective freeze distillation and permeated across the ionomer membrane may be sufficiently cooled to condense/deposit to a liquid/solid phase in the cold trap associated with the condenser. In some implementations, the cold trap associated with the condenser may take advantage of its "free" cooling capacity, where ambient environmental temperatures may cool the temperature of the cold trap. Moreover, the partial pressure of the cold trap associated with the condenser may be less than about 101 kPa, or equal to or less than about 0.6 kPa. That way, the approximately (or slightly less than) 101 kPa of water vapor generated from the cold trap associated with selective freeze distillation is greater than the partial pressure of water in the cold trap associated with the condenser. The partial pressure differential between cold traps will drive the water vapor across the ionomer membrane.

In some implementations, the purified water may be collected and transported using a transfer pump. The transfer pump may transfer the purified water from the membrane-based water separator or the condenser from one location to another. Specifically, to move the purified water from the membrane-based water separator, the transfer pump creates a difference in pressure. In some implementations, the transfer pump transports the water vapor to the condenser downstream from the membrane-based water separator. Alternatively or additionally, the transfer pump transports the water vapor to the electrolyzer or to water polisher downstream from the membrane-based water separator.

In some implementations, a dry purge gas or dry sweep gas may transport the water vapor from the membrane-based water separator. The purge gas may flow across the second surface of the ionomer membrane to pick up water vapor molecules to form a purified gas stream. The dry purge gas may carry the water vapor to the condenser for collecting the water vapor and forming purified water. In some implementations, the dry purge gas may be circulated in a gas recirculation loop between the membrane-based water separator and the condenser. Alternatively, the dry purge gas may carry the water vapor to an electrolyzer or water polisher.

In some implementations, condensation of the water vapor at the condenser can produce purified water that can be used without the need for further processing the recovered water. The recovered water may be utilized for crew use. In some implementations, the percentage of water recovery from the contaminated water can be greater than or equal to 75%, greater than or equal to 80%, greater than or equal to 85%, greater than or equal to 90%, or greater than or equal to 95%, or greater than or equal to 98%. The purity of the recovered water can be analyzed for water quality to meet water quality standards for drinking or for spacecraft use.

In some implementations, when the water vapor condenses in the condenser, stored heat from an exothermic reaction can be passed to the cold trap to continue a thermally closed cycle. For example, a regenerative heat exchanger may recycle at least 40%, at least 50%, at least 60%, or at least 70% of the heat from the condenser and transfer that heat to the cold trap. In some implementations, a temperature in the condenser may be reduced relative to the membrane-based water separator using the regenerative heat exchanger. Using the regenerative heat exchanger, the recycled heat can drive the conversion to a vapor phase at block 115 to continue the thermally closed cycle. Such a thermodynamic cycle of the process 100 can contribute to forming a thermally coupled system for producing purified water, hydrogen, and oxygen.

In some implementations, the purified water collected at the condenser or membrane-based water separator may be further purified using a water polisher. The water polisher may be upstream from the electrolyzer and downstream from the membrane-based water separator. In some implementations, the water polisher may use ion exchange to remove any residual inorganics. After polishing by the water polisher, the purified water may be of sufficient quality for crew use and electrolysis.

At block 130 of the process 100, the purified water is electrolyzed to produce hydrogen and oxygen using an electrolyzer downstream from the membrane-based water separator. Some of the purified water collected at the membrane-based water separator or the condenser may be stored for use by crew members. Some of the purified water collected at the membrane-based water separator or the condenser may be passed on to the electrolyzer to generate propellant. In some implementations, the purified water may be transferred to the electrolyzer using a transfer pump.

In some implementations, the purified water may be received in a vapor phase by the electrolyzer. In some implementations, the purified water may be received in a liquid phase by the electrolyzer. The electrolyzer may convert the purified water to hydrogen and oxygen by electrolysis. The oxygen may be stored for use in life support applications and/or propulsion. The hydrogen may be stored for use in propulsion.

Figure 6:
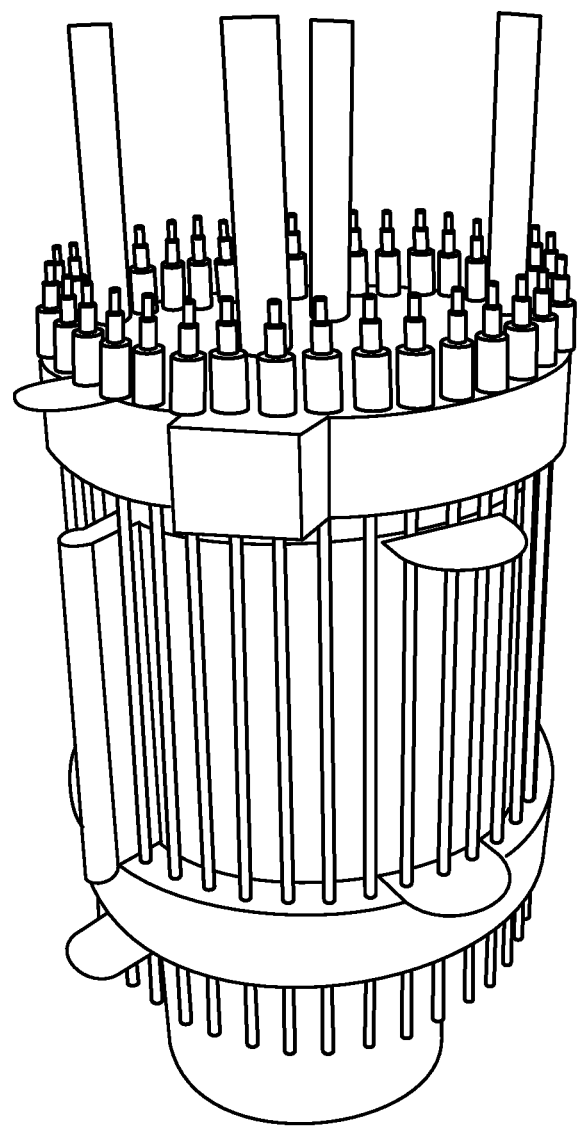
FIG. 6 shows an image of an example electrolyzer according to some implementations.

The purified water received by the electrolyzer may be substantially free of contaminants. Pure water systems can measure water quality based on electrolytic conductivity or resistivity measurements. For example, the purified water received by the electrolyzer can have a resistivity measurement of at least 10 MOhm, or a resistivity measurement between about 10 MOhm and about 18.2 MOhm. The purified water received by the electrolyzer may be substantially free of sulfur compounds such as hydrogen sulfide and sulfur dioxide, which may otherwise degrade the electrolyzer. In some implementations, the electrolyzer may be a solid oxide electrolyzer (SOE) or a proton exchange membrane (PEM) electrolyzer. An example of an electrolyzer is shown in FIG. 6.

One or more gas dryers may be coupled to the electrolyzer to produce dry oxygen and dry hydrogen. The dry oxygen and hydrogen are substantially free of moisture. The dry oxygen and hydrogen may be stored at low temperatures. For example, the dry oxygen may be stored at temperatures below about 90 K at atmospheric pressure, and the dry hydrogen may be stored at temperatures below about 33 K, such as about 20 K at atmospheric pressure.

Figure 2:
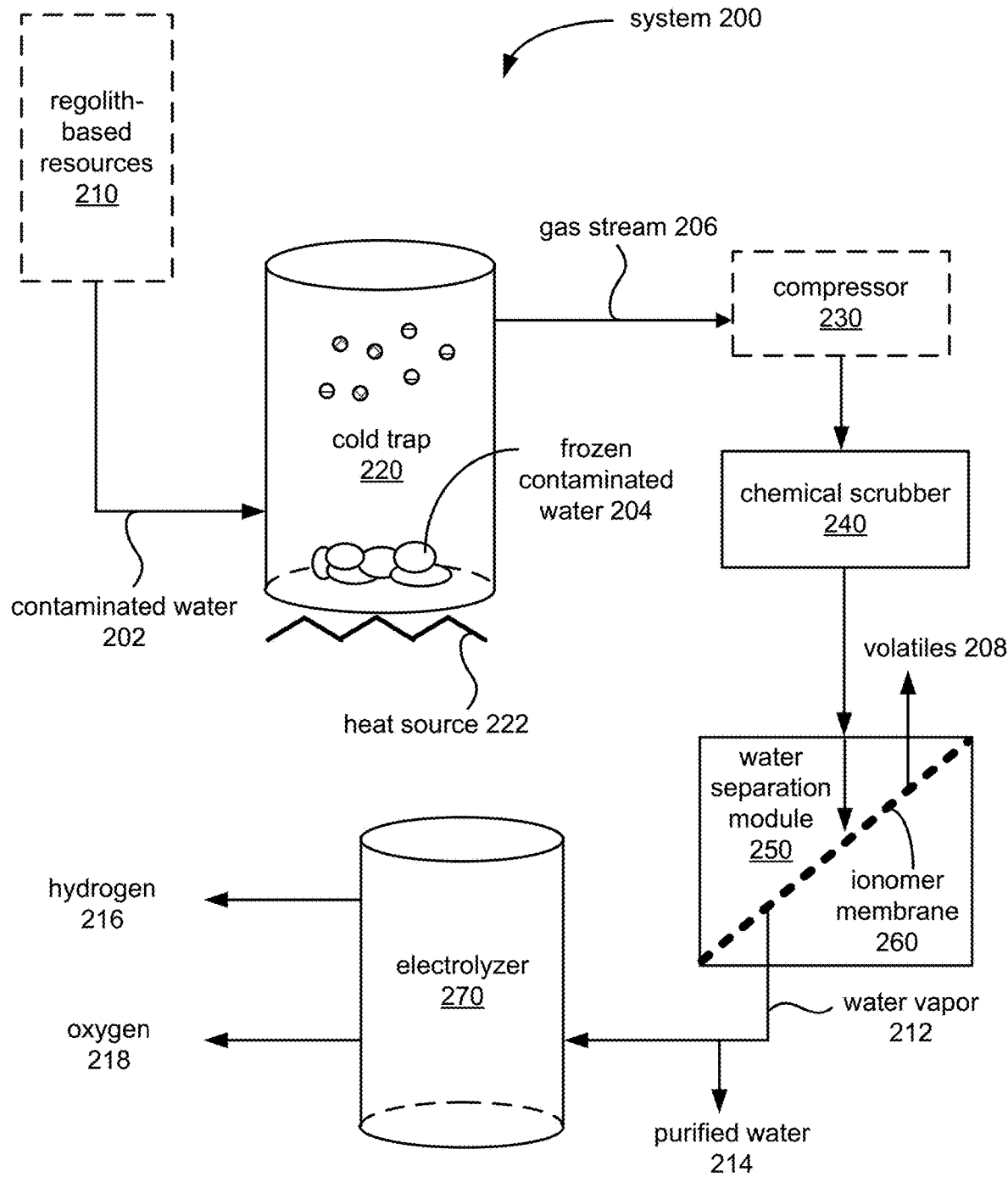
FIG. 2 shows a schematic diagram of an example integrated system for producing water, hydrogen, and oxygen from contaminated water according to some implementations.

FIG. 2 shows a schematic diagram of an example integrated system for producing water, hydrogen, and oxygen from contaminated water according to some implementations. An integrated system 200 may recover purified water 214 from contaminated water and such purified water 214 may be supplied for crew use, and the integrated system 200 may also produce dry hydrogen 216 and dry oxygen 218 for life support and/or propulsion. The integrated system 200 includes multiple modules or components that are spatially separated from one another and fluidly coupled to one another. The integrated system 200 in FIG. 2 allows for converting contaminated water 202 originating from regolith-based resources 210 into water, oxygen, and hydrogen under a single process or a single processing system. Additional processing steps are not performed at separate facilities or treatment plants. In other words, water, oxygen, and hydrogen can be produced from regolith-based resources 210 in a single processing system, where the components of the single processing system are fluidly coupled to one another.

As shown in FIG. 2, the integrated system 200 includes a cold trap 220, a heat source 222 thermally coupled to the cold trap 220, a chemical scrubber 240 downstream from and fluidly coupled to the cold trap 220, a water separation module 250 downstream from and fluidly coupled to the chemical scrubber 240, and an electrolyzer 270 downstream from the water separation module 250, where the electrolyzer 270 is configured to produce hydrogen 216 and oxygen 218 from water. The water separation module 250 includes an ionomer membrane 260 configured to be permeable to the water vapor and impermeable to one or more contaminants.

Contaminated water 202 may be introduced into a cold trap 220. In some implementations, the contaminated water 202 may be introduced in a vapor phase into the cold trap 220. The contaminated water 202 may originate from regolith-based resources 210, including but not limited to Martian, lunar, or near-Earth asteroid soil. The regolith-based resources 210 may contain water ice that is contaminated with various acids, ions, and water-soluble compounds. The regolith-based resources 210 may be mined to extract water ice. For example, the water ice may be extracted from permanently or near-permanently shadowed regions of the moon. The water ice may be heated and vaporized to generate the contaminated water 202 in the vapor phase, where the contaminated water 202 in the vapor phase may be generated by sublimation or melting/evaporation. In some implementations, the contaminated water 202 may include various contaminants such as ammonia, hydrogen sulfide, sulfur dioxide, and ethylene. In some implementations, the contaminated water may include various contaminants such as chlorine and hydrochloric acid.

The cold trap 220 may receive the contaminated water 202 in the vapor phase. The cold trap 220 may serve as a tank, vessel, or storage unit for the contaminated water 202. Pressure and temperature may be controlled in the cold trap 220 to deposit the contaminated water 202 in a solid phase. In some implementations, the cold trap 220 may be actively cooled or passively cooled to selectively freeze the contaminated water 202. Ambient environment temperatures may be as low as 40 K (−233° C.), while deep space is as low as 2.7 K (−270° C.). The cold trap 220 may take advantage of such ambient environment temperatures in depositing the contaminated water 202 in the solid phase. In some implementations, the cold trap 220 may be cooled to temperatures to selectively freeze out water, where the temperature of the cold trap 220 is cold enough to freeze water but warm enough to avoid freezing out one or more volatiles. For example, the cold trap 220 may be cooled to a temperature below the triple point temperature of 273 K to freeze water, but above triple point temperatures of hydrogen sulfide and ammonia, which have triple point temperatures of 191 K and 196 K, respectively. In some implementations, at a partial pressure of about 611 Pa or below, the cold trap 220 may be cooled to a temperature between about 197 K and about 272 K, between about 200 K and about 270 K, or between about 210 K and about 265 K. It will be understood that the deposition temperature of water and volatiles in the contaminated water 202 change with pressure, where the deposition temperatures decrease with reduced pressure. Pressure in the cold trap 220 may be operated at significantly reduced partial pressures, where a partial pressure of water is equal to or less than about 611 Pa, or equal to or less than about 2.6 Pa.

The contaminated water 202 in the vapor phase is selectively deposited in the cold trap 220 to capture frozen contaminated water 204 in the cold trap 220. Contaminants that are not frozen out may be vented out of the cold trap 220. After selective freeze distillation, the frozen contaminated water 204 has fewer contaminants than the contaminated water 202 in the vapor phase. In some implementations, the frozen contaminated water 204 may consist essentially of water.

The cold trap 220 may be thermally coupled with a heat source 222. In some implementations, the heat source 222 may be an external heat source that may be fueled by electricity or other suitable means. In some implementations, the heat source 222 may include a regenerative heat exchanger that is configured to cycle heat from a condenser to the cold trap 220.

In some implementations, the cold trap 220 may be fluidly coupled with a compressor 230. The heat source 222 and the compressor 230 operating in tandem may be configured to control temperature and pressure in the cold trap 220. In some implementations, the compressor 230 is upstream of the chemical scrubber 240 but downstream of the cold trap 220 as shown in FIG. 2. In some implementations, the compressor 230 is downstream of the chemical scrubber 240 but upstream of the water separation module 250.

After water in the contaminated water 202 is selectively deposited in the cold trap 220, the heat source 222 may increase the temperature of the cold trap 220 to convert the frozen contaminated water 204 into a gas stream 206. In other words, the partially contaminated water in the solid phase is converted to partially contaminated water in the vapor phase. As shown in FIG. 2, the compressor 230 may serve to reduce a partial pressure in a space above the frozen contaminated water 204 in the cold trap 220, thereby establishing a partial pressure differential required for sublimation to occur. That way, frozen water may be converted to water vapor at reduced temperatures. The heat source 222 may apply thermal energy to the cold trap 220 to convert the frozen contaminated water 204 to the gas stream 206, where the temperature of the cold trap 220 can be between about 215 K and about 265 K or between about 230 K and about 250 K.

The compressor 230 may serve to provide mass transport of gas from the cold trap 220 to a chemical scrubber 240 and water separation module 250. The heat source 222 may serve to increase a temperature of the cold trap 220 to convert the frozen contaminated water 204 to the gas stream 206, liberating water vapor and volatiles into a vapor phase.

In some implementations, the integrated system 200 does not necessarily include a compressor 230. Instead, the cold trap 220 with the frozen contaminated water 204 in the cold trap 220 may be sealed, heated, and pressurized to convert the frozen contaminated water 204 to the gas stream 206. The cold trap 220 may be sealed and heated with the heat source 222 until the partial pressure of water in the cold trap 220 is equal to or greater than about 101 kPa and until the cold trap 220 reaches a temperature equal to or greater than about 373 K so that the frozen contaminated water 204 converts to a vapor phase. If the selective freeze distillation in the cold trap 220 primarily isolated water from contaminants, then there are not significant contaminants that volatilize at the higher temperature of at least about 373 K. The sealed, heated, and pressurized cold trap 220 generates approximately 101 kPa of water vapor in the gas stream 206. The approximately 101 kPa of water vapor in the gas stream 206 is used for mass transport of water vapor to the water separator module 250 when the cold trap 220 is unsealed. The entire working pressure for downstream process components may be provided without the compressor 230 or in tandem with the compressor 230.

The frozen contaminated water 204 is vaporized to produce the gas stream 206 comprising water vapor and volatiles. The gas stream 206 flows from the cold trap 220 to a chemical scrubber 240. The chemical scrubber 240 is downstream from and fluidly coupled with the cold trap 220. The chemical scrubber 240 serves to remove one or more volatiles from the gas stream 206. In some implementations, the chemical scrubber 240 is an ammonia scrubber. In some implementations, the compressor 230 is positioned between the chemical scrubber 240 and the cold trap 220 (as shown in FIG. 2). In some implementations, the compressor 230 is positioned between the chemical scrubber 240 and a water separation module 250. In some implementations, no compressor 230 is provided in the integrated system 200. As used herein, the water separation module 250 may also be referred to as a membrane-based water separator. The compressor 230 may serve to drive the gas stream 206 by mass transfer to the water separation module 250 and/or the chemical scrubber 240 without the aid of forced convection. Alternatively, having a sealed, heated, and pressurized cold trap 220 may serve to drive the gas stream 206 by mass transfer to the water separation module 250 and/or the chemical scrubber 240 without the aid of forced convection. This limits incorporation of fans and blowers in the integrated system 200.

The water separation module 250 is downstream from and fluidly coupled with the cold trap 220 and the chemical scrubber 240. The water separation module 250 is spatially separated from the cold trap 220 and the chemical scrubber 240. The water separation module 250 may be spatially separated from the cold trap 220 to separate the frozen contaminated water 204 in the solid phase from the gas stream 206 in the gas phase. Mass transport of the gas stream 206 to the water separation module 250 may occur via total pressure differential.

The water separation module 250 may be configured to separate water vapor from volatiles in the gas stream 206. In some implementations as shown in FIG. 2, the water separation module 250 may include an ionomer membrane 260 configured to be substantially permeable to water vapor 212 but substantially impermeable to volatiles 208. In some implementations, the ionomer membrane 260 can include a non-porous fluorinated ionomer membrane with exposed sulfonic acid groups. For example, the ionomer membrane 260 can include Nafion®. The ionomer membrane 260 may selectively permeate the water vapor 212 from the gas stream 206 while substantially rejecting the volatiles 208 from the gas stream 206. The rejected volatiles 208 may concentrate together to be recollected, recycled, or vented out of the integrated system 200. A partial pressure differential may drive the water vapor 212 across the ionomer membrane 260 from a "dirty" side of the ionomer membrane 260 to a "clean" side of the ionomer membrane 260.

The ionomer membrane 260 serves as a chemically selective membrane that allows compounds that bind to sulfonic acid groups to readily permeate through the ionomer membrane 260, including water. The ionomer membrane 260 is a chemically-sensitive membrane in that it selectively passes water through the ionomer membrane 260 based on chemical affinity. Rather than selectively removing water or other gases based on molecular size, the ionomer membrane 260 can remove water and other gases based on chemical affinity. For example, the ionomer membrane 260 can remove water and other gases based on their chemical affinity for sulfonic acid groups.

While Nafion® is an illustrative example of a material for selectively separating water vapor, it will be understood that other materials or fluids may be used in the water separation module 250. Nafion® is a copolymer of tetrafluoroethylene and perfluro-3,6-dioxa-4-methyl-7-octene-sulfonic acid. It is an inert fluorocarbon polymer with ionic channels of sulfonic acid groups scattered throughout. Nafion® is highly resistant to chemical attack, as only alkali metals such as sodium are known to degrade Nafion® under normal temperatures and pressures. In fact, strong acids may be used to regenerate Nafion® if it has been exposed to solutions containing cations. Because of its inertness, Nafion® can be safely disposed in landfills. Nafion® does not burn in ambient air and is more flame-resistant than most other plastics, with a limiting oxygen index of 95%. Nafion® sheets are commercially available through Ion Power, Inc., which is a distributor of Nafion® under The Chemours Company of Wilmington, Del. Different thicknesses of Nafion® are commercially available, which can affect the permeation rates.

Nafion® includes a bulk fluorocarbon matrix with exposed sulfonic acid groups immobilized in the bulk fluorocarbon matrix. Unlike the fluorocarbon matrix, the sulfonic acid groups do not participate in chemical reactions. As a result, the sulfonic acid groups provide several important properties to Nafion®. First, Nafion® functions as an acid catalyst due to the strongly acidic properties of the sulfonic acid group. Second, Nafion® functions as an ion exchange resin when exposed to liquid solutions. Third, Nafion® can readily absorb water, from the vapor phase or the liquid phase. Each of the sulfonic acid groups can absorb up to 13 molecules of water. The sulfonic acid groups can form ionic channels through the fluorocarbon polymer, and water can be easily transported through these channels. Thus, Nafion® can serve as a selective, semi-permeable membrane to water vapor. In some implementations, the ionomer membrane 260 can be provided as a sheet or sheets of Nafion®. In some implementations, the Nafion® of the ionomer membrane 260 can be provided as tubes that can form Nafion® tube walls. Nafion® tubes may be commercially available through Perma Pure LLC of Toms River, N.J.

Nafion® can serve as a selective, semi-permeable membrane to water vapor for water purification because the sulfonic acid groups can pass water while rejecting other compounds, making it possible to separate water from other contaminants or volatiles. The fact that Nafion® acts as an ion exchange resin when exposed to liquids implies that Nafion® is more effective processing gases rather than liquid solutions. When gases and vapors encounter the Nafion®, the Nafion® selectively permeates water vapor while blocking or otherwise "retaining" the volatiles of other compounds. As used herein, "retaining" means that the volatiles of the compounds do not pass through the ionomer membrane 260. The retained volatiles can include various sulfur compounds such as hydrogen sulfide and sulfur dioxide. Some of the volatiles may be retained by converting into another compound, where some compounds may be susceptible to acid catalysis, for example.

A geometric configuration of the ionomer membrane 260 may optimize membrane surface area in contact with the gas stream 206 to provide increased water production. An optimized membrane surface area may depend on a variety of factors, such as gas flow rates, membrane thickness, desired flux, desired water processing rate, size limitations, weight limitations, etc. In some implementations, the membrane surface area may be at least 0.8 $m^2$, at least 1 $m^2$, at least 3 $m^2$, at least 5 $m^2$, at least 8 $m^2$, at least 10 $m^2$, or between 100 $m^2$ and 2000 $m^2$. Increased surface area in the water separation module 250 may provide an increased flux, increased lifetime, and increased water processing rate for permeated water vapor 212. In some implementations, the ionomer membrane 260 may be a tube-and-shell geometry, where the ionomer membrane 260 includes a plurality of tubes. In some implementations, the ionomer membrane 260 may be a spiral-wound geometry. In some implementations, the ionomer membrane 260 may be a stacked flat-sheet geometry.

Permeated water vapor 212 may be collected at the water separation module 250 or at a condenser (not shown) fluidly coupled to the water separation module 250. In some implementations, the condenser may include an associated cold trap (not shown) for cooling and condensing the permeated water vapor 212. For example, the cold trap associated with the condenser may be cooled to a temperature less than about 373 K and a partial pressure of water less than about 101 kPa, or to a temperature equal to or less than about 273 K and a partial pressure of water equal to or less than about 0.6 kPa. In some implementations, a purge gas or dry sweep gas may circulate through the "clean" side of the water separation module 250 to collect the water vapor 212. In some implementations, the permeated water vapor 212 may be collected as purified water 214 for crew use. In some implementations, the permeated water vapor 212 may be flowed to an electrolyzer 270 via a transfer pump (not shown). The electrolyzer 270 may be downstream from and fluidly coupled to the water separation module 250. In some implementations, the permeated water vapor 212 may be further purified using a water polisher (not shown) before delivery to the electrolyzer 270 or before collection as purified water 214 for crew use.

The electrolyzer 270 may convert the permeated water vapor 212 into hydrogen 216 and oxygen 218 by electrolysis. The hydrogen 216 and oxygen 218 may be stored and used for propellant. Alternatively or additionally, the oxygen 218 may be stored and used for life support. The electrolyzer 270 may receive water in a vapor phase, though it will be understood that the electrolyzer 270 may receive water in a liquid phase in some implementations. In some implementations, the electrolyzer 270 includes a PEM electrolyzer.

Figure 3:
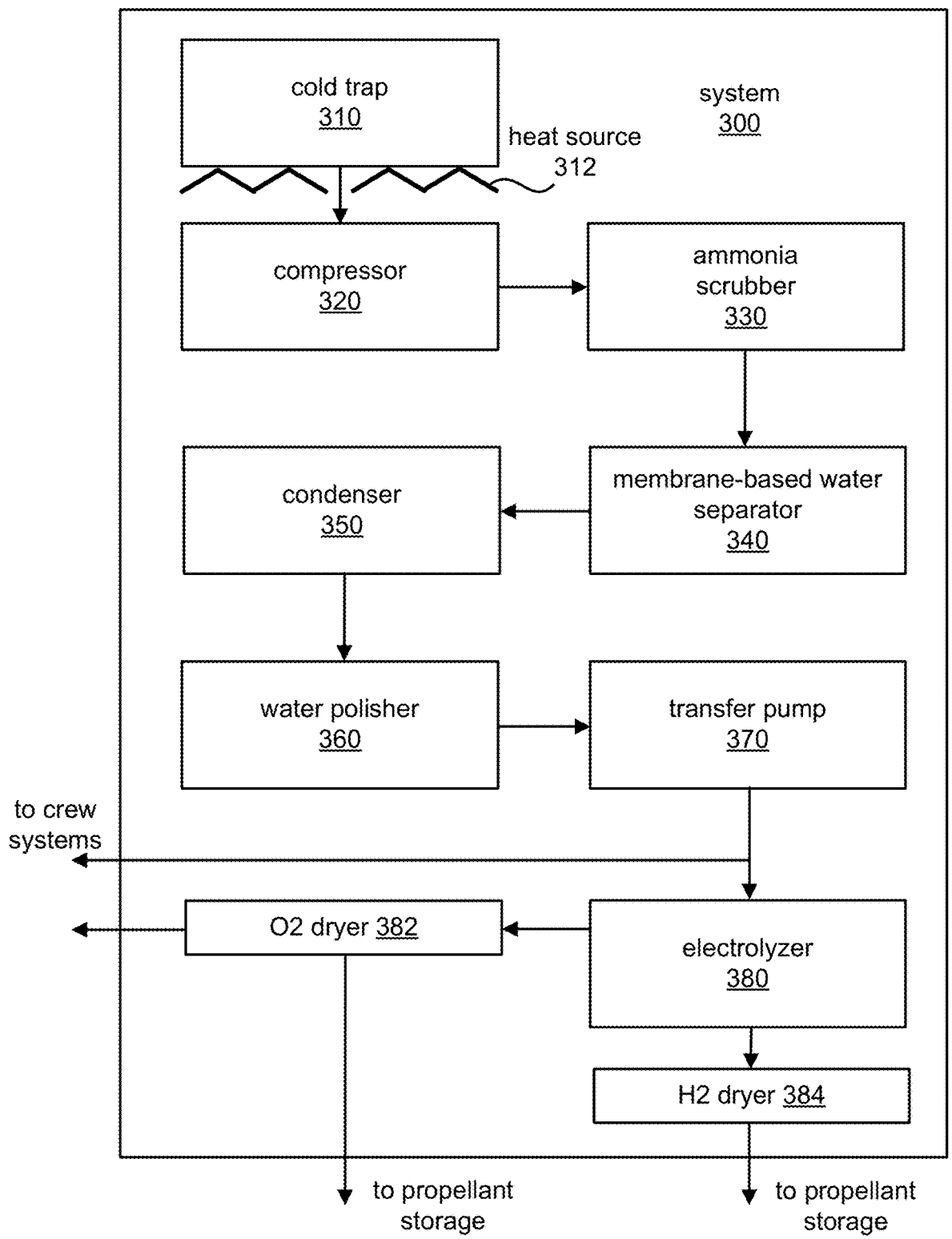
FIG. 3 shows a schematic diagram of an example integrated system for ISRU-derived water purification and hydrogen and oxygen production according to some implementations.

FIG. 3 shows a schematic diagram of an example system for ISRU-derived water purification and hydrogen and oxygen production according to some implementations. The system 300 includes a cold trap 310, a compressor 320, an ammonia scrubber 330, a membrane-based water separator 340, a condenser 350, a water polisher 360, a transfer pump 370, and an electrolyzer 380. The aforementioned components in the system 300 are integrated in a single processing system and are not provided at separate facilities.

The system 300 includes a cold trap 310 for receiving ISRU-derived contaminated water. The ISRU-derived contaminated water may be mined and extracted from lunar, Martian, or near-Earth asteroid soil. Put another way, the ISRU-derived contaminated water may be mined and extracted from regolith-based resources. The ISRU-derived contaminated water may be received in the vapor phase. The cold trap 310 includes a plurality of cooled plates or surfaces. Active or passive surface temperature control methods may be applied to cool surfaces of the cold trap 310. In addition, a heat source 312 may be thermally coupled to the cold trap 310 for adjusting a temperature of the cold trap 310. The compressor 320 may be fluidly coupled to the cold trap 310 for controlling mass transfer of gases from the cold trap 310 to the membrane-based water separator 340. The temperature in the cold trap 310 may be reduced to convert the ISRU-derived contaminated water from the vapor phase to a solid phase (e.g., deposition). One or more volatiles of the ISRU-derived contaminated water may remain in the vapor phase and subsequently vented. Selective deposition of water may thus be accomplished by freeze distillation in the cold trap.

The temperature in the cold trap 310 may be subsequently increased and/or the partial pressure in the cold trap 310 may be subsequently reduced to convert the ISRU-derived contaminated water in the solid phase to a vapor phase (e.g., sublimation). Heat generated from an electrically-powered heat source or from downstream exothermic reactions may facilitate sublimation of the ISRU-derived contaminated water in the solid phase. The heat source 312 and the compressor 320 operating in tandem may facilitate conversion of the ISRU-derived contaminated water in the solid phase to the vapor phase.

Conversion of the ISRU-derived contaminated water into the vapor phase provides a gas stream comprising water vapor and volatiles. The gas stream passes through the compressor 320 positioned downstream from the cold trap 310. The gas stream flows to an ammonia scrubber 330 that is downstream from and fluidly coupled with the compressor 320. The ammonia scrubber 330 removes at least ammonia from the gas stream prior to purification by a membrane-based water separator 340.

The gas stream comprising water vapor and volatiles is flowed to the membrane-based water separator 340 that is positioned downstream from and fluidly coupled with the ammonia scrubber 330. The membrane-based water separator 340 may include an ionomer membrane such as a fluorinated ionomer membrane with exposed sulfonic acid groups. Aspects of the ionomer membrane are described above. The ionomer membrane may be non-porous and does not require moving parts. The ionomer membrane may operate in gravity-less environments and may effectively recover water vapor over time without degradation in performance. The membrane-based water separator 340 may serve as a chemically selective barrier that is permeable to water vapor and impermeable or at least substantially impermeable to volatiles such as hydrogen sulfide and sulfur dioxide.

Water vapor may be collected at the membrane-based water separator 340 or at a condenser 350 positioned downstream from and fluidly coupled with the membrane-based water separator 340. The condenser 350 may include a water tank or purified water tank for collection of purified water from condensation of the water vapor. A regenerative heat exchanger (which may be represented by the heat source 312) may cycle heat generated from the condenser 350 back to the cold trap 310. An amount of purified water collected in the condenser 350 or in the membrane-based water separator 340 may be equal to or greater than 75%, equal to or greater than 80%, equal to or greater than 85%, equal to or greater than 90%, equal to or greater than 95%, or equal to or greater than 98% of the water in the ISRU-derived contaminated water.

The collected water vapor may be further polished by a water polisher 360 positioned downstream from and fluidly coupled with the condenser 350. The water polisher 360 may use ion exchange to remove any residual inorganics. After polishing by the water polisher 360, the water may be of sufficient quality for crew use and electrolysis.

The water may be transferred via a transfer pump 370 to an electrolyzer 380 to produce hydrogen and oxygen, or the water may be transferred via the transfer pump 370 to storage for crew use. The transfer pump 370 is positioned downstream from and fluidly coupled with the water polisher 360, and the electrolyzer 380 is positioned downstream from and fluidly coupled with the transfer pump 370. The electrolyzer 380 may convert the water polished by the water polisher 360 to produce hydrogen and oxygen by electrolysis. The oxygen may be dried by an oxygen dryer 382 to remove moisture so that the oxygen may be delivered to storage for crew use or propellant. The hydrogen may be dried by a hydrogen dryer 384 to remove moisture so that the hydrogen may be delivered to storage for propellant.

Figure 7:
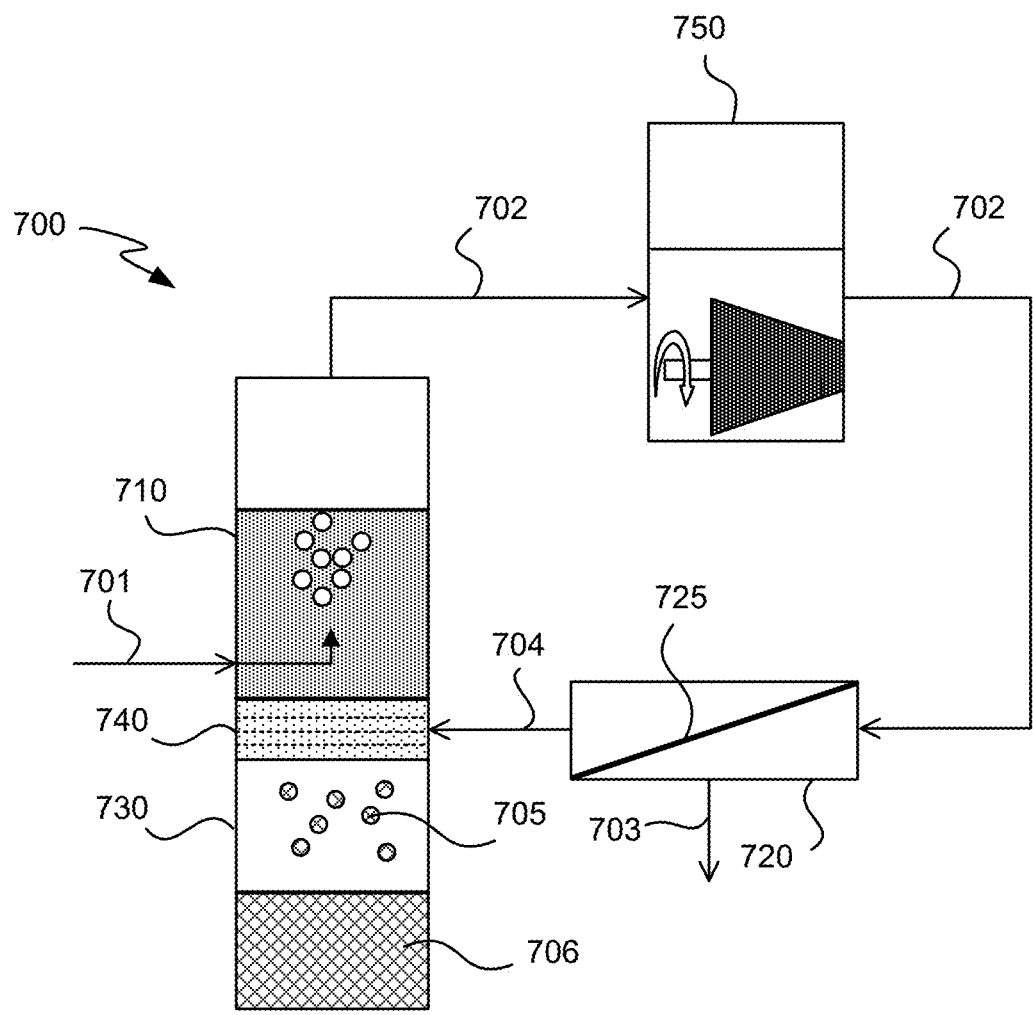
FIG. 7 shows a schematic block diagram of an example system for recovering purified water from contaminated water using differentials in partial pressure according to some implementations.

FIG. 7 shows a schematic block diagram of an example system for recovering purified water from contaminated water using differentials in partial pressure according to some implementations. A system 700 shows a thermally coupled system for recovering purified water, though it will be understood that the system 700 may operate to recover purified water in a thermally decoupled system. The system 700 may illustrate a thermodynamic loop for energy savings and may operate with few, if any, gas recirculation loops.

The system 700 includes a first containment unit 710 configured to receive contaminated water 701, a water separation module 720 fluidly coupled to the first containment unit 710, and a second containment unit 730 fluidly coupled to the first containment unit 710. The first containment unit 710 may also be referred to as an "evaporation container" or "cold trap," and the second containment unit 730 may also be referred to as a "condenser module" or "purified water tank." In some implementations, the water separation module 720 may also be referred to as a "membrane module."

The contaminated water 701 in FIG. 7 may include various contaminants including ions, acids, and water soluble compounds. The system 700 may include a heat source thermally coupled to the first containment unit 710, where the heat source is configured to heat the contaminated water 701 in a solid phase to produce water vapor and volatiles (e.g., ammonia, hydrogen sulfide, sulfur dioxide, etc.) of the contaminated water 701. A gas stream 702 carrying the water vapor and volatiles may be transferred to the water separation module 720 by a total pressure differential. At least some of the heat for vaporizing the contaminated water 701 may be provided by a regenerative heat exchanger 740 in the system 700. It will be understood, however, that other external heat sources may be used in addition or in the alternative to the regenerative heat exchanger 740 to heat up the first containment unit 710.

A compressor 750 may be positioned between the first containment unit 710 and the water separation module 720. For example, the compressor 750 may be a mechanical compressor. The compressor 750 may be fluidly coupled to the first containment unit 710 and fluidly coupled to the water separation module 720. The compressor 750 may be configured to reduce or maintain a pressure in the first containment unit 710 so that the pressure in the first containment unit 710 is below atmospheric pressure. Reducing the partial pressure of water in the first containment unit 710 reduces the vapor pressure of sublimation so that frozen water can be sublimated at a lower temperature. For example, the contaminated water 701 may phase change from solid to gas at a temperature below about 273 K, such as about 265 K, 255 K, 250 K, 245 K, 240 K, 235 K, 230 K, 225 K, 220 K, 215 K, or 210 K. With a lower sublimation temperature, certain breakdown products that typically form at higher temperatures will not be formed. In other words, certain compounds from the volatiles that are more prone to form at higher temperatures will not form at the lower sublimation temperature. These compounds or breakdown products may otherwise contaminate or add to the gas stream 702 that the water separation module 720 would have to retain/reject from the system 700.

The water separation module 720 may include an ionomer membrane 725, where the ionomer membrane 725 has a first surface configured to receive and contact the gas stream 702 from the first containment unit 710 and a second surface opposite the first surface. A partial pressure differential can be formed between a first surface of the ionomer membrane 725 and a second surface of the ionomer membrane 725, where the water vapor partial pressure differential at the second surface is less than the water vapor partial pressure at the first surface. Having the compressor 750 between the first containment unit 710 and the water separation module 720 facilitates an increase in water vapor partial pressure at the first surface of the ionomer membrane 725. The compressor 750 generates heat to form super-heated water vapor in the gas stream 702. The compressor 750 also generates a very high water vapor partial pressure at the first surface of the ionomer membrane 725. The very high water vapor partial pressure at the first surface of the ionomer membrane 725 along with a relatively low water vapor partial pressure at the second surface of the ionomer membrane 725 creates a significant partial pressure differential to drive the water vapor across the ionomer membrane 725. The ionomer membrane 725 may selectively permeate water vapor from the first surface to the second surface and substantially reject volatiles 703 at the first surface. In some implementations, the rejected volatiles 703 may be vented or transferred to another module or container for further treatment/disposal. It will be understood that the system 700 may not necessarily include a gas recirculation loop between the first containment unit 710 and the water separation module 720.

In some implementations, the ionomer membrane 725 includes Nafion®. The ionomer membrane 725 facilitates transfer of water vapor 704 by chemical affinity. The first containment unit 710 provides solid-gas separation whereas the water separation module 720 provides gas-gas separation.

In some implementations, the system 700 does not have a vacuum pump or other type of pump between the water separation module 720 and the second containment unit 730. Such a pump ordinarily would reduce the pressure down to as close to vacuum pressure as possible so as to create a very low water vapor partial pressure at the second surface of the ionomer membrane 725, thereby creating a significant partial pressure differential. However, to reach such a significant or desirable partial pressure differential, the pump would be a specialized pump or precision pump that would be costly to manufacture and implement. However, implementing the compressor 750 between the first containment unit 710 and the water separation module 720 allows the system 700 to create the significant or desirable partial pressure across the ionomer membrane 725 without having to implement a costly pump. The configuration of the system 700 allows more water vapor 704 to be transported (e.g., at least 15 kg of water/day).

In some implementations, the compressor 750 reduces the sublimation temperature of water by reducing a partial pressure of water in the first containment unit 710. The contaminated water 701 in the first containment unit is heated so that frozen water is changed to water vapor in a gas stream 702. The gas stream 702 passes through the compressor 750 that generates heat to raise the temperature of the first gas stream and increases the water vapor partial pressure at the first surface of the ionomer membrane 725. The water vapor partial pressure at the second surface of the ionomer membrane 725 is less than the water vapor partial pressure at the first surface. Rather than implementing a specialized pump to bring the water vapor partial pressure at the second surface of the ionomer membrane 725 to a very low partial pressure, the compressor 750 serves to significantly increase the water vapor partial pressure at the first surface of the ionomer membrane 725.

In a thermally decoupled system, water vapor 705 may condense in the second containment unit 730 at a reduced temperature and/or pressure relative to the first containment unit 710. For example, a condenser can achieve this condition, where a condenser can achieve a lower partial pressure at the second surface. In a thermally coupled system 700 as shown in FIG. 7, the water vapor 705 may condense in the second containment unit 730 at an increased temperature and/or pressure relative to the first containment unit 710.

At the second containment unit 730, water vapor 705 condenses and releases heat as a result of the condensation, increasing the temperature in the second containment unit 730. A regenerative heat exchanger 740 may transfer heat from the second containment unit 730 to the first containment unit 710. Accordingly, the regenerative heat exchanger 740 may reduce a temperature in the second containment unit 730 relative to the water separation module 720, where the regenerative heat exchanger 740 is configured to cycle heat from the second containment unit 730 to the first containment unit 710. Thus, the regenerative heat exchanger 740 may be thermally coupled to both the first containment unit 710 and the second containment unit 730.

When the water vapor 705 condenses, it forms purified water 706 that can be stored in the second containment unit 730 and subsequently transferred for local use. In addition or in the alternative, the purified water may be transferred to an electrolyzer to produce hydrogen and oxygen by electrolysis.

The compressor 750 in FIG. 7 is configured to reduce a vapor pressure of sublimation in the first containment unit 710 (e.g., cold trap) and also increase the water vapor partial pressure differential across the ionomer membrane 725.

Although the foregoing disclosed systems, methods, apparatuses, processes, and compositions have been described in detail within the context of specific implementations for the purpose of promoting clarity and understanding, it will be apparent to one of ordinary skill in the art that there are many alternative ways of implementing foregoing implementations which are within the spirit and scope of this disclosure. Accordingly, the implementations described herein are to be viewed as illustrative of the disclosed inventive concepts rather than restrictively, and are not to be used as an impermissible basis for unduly limiting the scope of any claims eventually directed to the subject matter of this disclosure.

What is claimed is:

1. A system for producing hydrogen and oxygen from contaminated water, comprising:
    a cold trap configured to receive contaminated water in a vapor phase;
    a heat source thermally coupled to the cold trap;
    a chemical scrubber downstream from and fluidly coupled to the cold trap;
    a membrane-based water separator downstream from the chemical scrubber and fluidly coupled to the chemical scrubber, wherein the membrane-based water separator includes an ionomer membrane configured to be permeable to water vapor and impermeable to one or more contaminants; and
    an electrolyzer downstream from and fluidly coupled to the membrane-based water separator and configured to produce hydrogen and oxygen from the water vapor.

2. The system of claim 1, further comprising:
    a compressor downstream from the cold trap and fluidly coupled to the cold trap, wherein the chemical scrubber is downstream from or upstream from the compressor.

3. The system of claim 2, wherein the compressor is configured to reduce a water vapor partial pressure in the cold trap and to increase a water vapor partial pressure differential across the ionomer membrane.

4. The system of claim 1, wherein a temperature and pressure of the cold trap selectively deposits the contaminated water from the vapor phase to produce partially contaminated water in a solid phase.

5. The system of claim 4, wherein a temperature of the cold trap is less than about 273 K.

6. The system of claim 4, wherein the heat source is configured to vaporize the partially contaminated water in the solid phase to produce a gas stream comprising the water vapor and volatiles.

7. The system of claim 6, wherein the ionomer membrane has a first surface configured to receive and contact the gas stream and a second surface opposite the first surface, wherein a water vapor partial pressure at the second surface is less than a water vapor partial pressure at the first surface.

8. The system of claim 1, further comprising:
a water polisher upstream from the electrolyzer and downstream from the membrane-based water separator and fluidly coupled to the membrane-based water separator.

9. The system of claim 1, further comprising:
a condenser downstream from and fluidly coupled with the membrane-based water separator, wherein the condenser is configured to collect the water vapor.

10. The system of claim 9, further comprising:
a regenerative heat exchanger thermally coupled with the condenser and the cold trap, wherein the regenerative heat exchanger is configured to cycle heat from the condenser to the cold trap.

11. The system of claim 9, wherein the condenser includes an associated cold trap, the cold trap associated with the condenser being different than the cold trap configured to receive contaminated water in the vapor phase.

12. The system of claim 1, wherein the chemical scrubber includes an ammonia scrubber for removing at least ammonia ($NH_3$) from the contaminated water.

13. The system of claim 1, wherein the ionomer membrane is impermeable to at least hydrogen sulfide ($H_2S$) and sulfur dioxide ($SO_2$).

14. The system of claim 1, further comprising:
one or more gas dryers downstream from and fluidly coupled to the electrolyzer for producing dry hydrogen and dry oxygen from the hydrogen and the oxygen.

15. The system of claim 1, wherein the ionomer membrane includes a non-porous fluorinated ionomer membrane with exposed sulfonic acid groups.

* * * * *